(12) United States Patent
Yue et al.

(10) Patent No.: US 7,224,364 B1
(45) Date of Patent: May 29, 2007

(54) OPTIMAL INITIAL RASTERIZATION STARTING POINT

(75) Inventors: Lordson L. Yue, Foster City, CA (US); James T. Battle, San Jose, CA (US)

(73) Assignee: ATI International SRL, Christchurch (BB)

( * ) Notice: Subject to any disclaimer, the term of this patent is extended or adjusted under 35 U.S.C. 154(b) by 0 days.

(21) Appl. No.: 09/244,270

(22) Filed: Feb. 3, 1999

(51) Int. Cl.
*G06T 11/00* (2006.01)
*G06T 11/20* (2006.01)

(52) U.S. Cl. .................................. 345/468; 345/441
(58) Field of Classification Search ................ 345/441, 345/443, 434, 435, 427, 421, 468
See application file for complete search history.

(56) References Cited

U.S. PATENT DOCUMENTS

| | | | | |
|---|---|---|---|---|
| 4,930,091 A | * | 5/1990 | Schroeder et al. | 364/522 |
| 5,040,130 A | * | 8/1991 | Chang et al. | 345/622 |
| 5,079,719 A | * | 1/1992 | Maillot | 345/622 |
| 5,357,599 A | | 10/1994 | Luken | |
| 5,422,991 A | * | 6/1995 | Fowler | 395/143 |
| 5,446,836 A | * | 8/1995 | Lentz et al. | 395/141 |
| 5,452,412 A | * | 9/1995 | Johnson, Jr. et al. | 395/143 |
| 5,455,897 A | * | 10/1995 | Nicholl et al. | 345/627 |
| 5,528,737 A | * | 6/1996 | Sfarti | 395/141 |
| 5,831,634 A | * | 11/1998 | Wakasu | 345/441 |
| 5,852,443 A | | 12/1998 | Kenworthy | |
| 5,914,722 A | * | 6/1999 | Aleksic | 345/423 |
| 5,959,606 A | * | 9/1999 | Goodman et al. | 345/690 |
| 5,977,987 A | * | 11/1999 | Duluk, Jr. | 345/441 |
| 5,982,384 A | * | 11/1999 | Prouty et al. | 345/441 |
| 6,034,699 A | * | 3/2000 | Wong et al. | 345/441 |
| 6,052,128 A | * | 4/2000 | Narayanaswami et al. | 345/620 |
| 6,052,129 A | * | 4/2000 | Fowler et al. | 345/620 |
| 6,094,201 A | * | 7/2000 | Malamy et al. | 345/441 |
| 6,177,944 B1 | * | 1/2001 | Fowler et al. | 345/426 |
| 6,246,415 B1 | * | 6/2001 | Grossman et al. | 345/422 |
| 6,597,363 B1 | * | 7/2003 | Duluk et al. | 345/506 |

OTHER PUBLICATIONS

Foey, "Computer Graphics: Principles and Practice", 2nd Edition, Jul. 1997, p. 113-p. 115.*

* cited by examiner

*Primary Examiner*—Kee M. Tung
*Assistant Examiner*—Michelle K. Lay
(74) *Attorney, Agent, or Firm*—Vedder, Price, Kaufman & Kammholz, P.C.

(57) ABSTRACT

A frame buffer is divided into tiles of, for example, 32 by 32 pixels. Triangles (and portions thereof) that are within a given tile are rasterized one triangle at a time into the tile location. This process repeats for each tile in the image frame. A sorting circuit generates control bits representing a vertical order of the vertices of a current triangle. A series of multiplexers vertically sorts the vertices bases on these control bits. A region calculation circuit generates region bits representing a location each of the vertices with respect to the current tile. A trivial discard of the triangle data occurs if the region bits indicate that the entire triangle lies outside of the tile. Subsequently, an initial rasterization starting point is estimated based on the region bits to lower the time needed for the rasterizer to find the first pixel of the current triangle to be assigned values.

32 Claims, 5 Drawing Sheets

OPTIMAL INITIAL RASTERIZATION STARTING POINT

BACKGROUND OF THE INVENTION

An image typically includes several objects (e.g., a tree, sky or animated character). Each object may be computer represented by a group of triangles. Vertex data for each triangle includes x and y-coordinate data defining the position of each vertex of the triangle within the image. In three-dimensional applications, the vertex data also includes z-coordinate data which defines the depth of the triangle in virtual space. On a display, a triangle having a greater depth may be obscured by a triangle having a lesser depth, thereby giving the appearance that the image is three-dimensional.

In writing each image frame, a graphics processor feeds triangle data, one triangle at a time, to a rasterizer which assigns luminance and color values to each pixel location within the triangle. After all triangles of the image frame are written into a frame buffer, the image frame is displayed. In typical graphics applications, an image frame may include many thousands of triangles depending on the image resolution of the image frame. Furthermore, many image frames are displayed each second in graphics applications. Thus, as the graphics applications become more complex, the graphics processor and rasterizer must operate faster.

SUMMARY OF THE INVENTION

Images may be represented as a group of triangles. A rasterizer assigns pixel values corresponding to one triangle at a time to a frame buffer, each triangle represented by vertex data. In one embodiment, a frame buffer is divided into tiles of, for example, 32 by 32 pixels. Triangles (and portions thereof) that are within a current tile are rasterized one triangle at a time into the tile location. This process repeats for each tile in the image frame. For graphics applications, this process repeats for each image frame in the graphics stream.

In accordance with the present invention, vertex data corresponding to three vertices of a triangle are received in a sorting circuit. The sorting circuit generates control bits representing an order of the vertices along, for example, the vertical direction. A multiplexer passes data corresponding to one (e.g., the highest) of the vertices in response to the control bits. Similarly, other multiplexers may pass data corresponding to the middle and lowest vertices. Thus, the vertices of the triangle are sorted through the multiplexers such that the ordering of the vertices after the multiplexer is predictable. This predictability simplifies the downstream logic circuit by reducing the vertex position permutations that the downstream logic circuit may encounter.

A region calculation circuit generates region bits representing a location of each of the vertices with respect to a current tile. A trivial discard of the triangle data occurs if the region bits indicate that the entire triangle lies outside of the tile. For example, a trivial discard occurs if the region bits indicate that the lowest vertex is higher than the top edge of the tile, that the highest vertex is lower than the bottom edge of the tile, that all the vertices are left of the left edge of the tile, or that all the vertices are right of the right edge of the tile.

After the trivial discard, initial rasterization starting point estimate coordinates are generated for the rasterizer. This starting point estimate lowers the time needed for the rasterizer to find the first pixel of the current triangle to be assigned values. The starting point may be generated using the region bits.

The principles of the present invention will best be understood in light of the following detailed description along with the accompanying drawings.

DETAILED DESCRIPTION OF THE INVENTION

In this description, the same or similar elements in different drawings are identified with the same reference symbols. In this description, "&" means logical AND, "+" means logical OR, and "!" means logical NOT. Items within parentheses "( )" have highest logical priority followed by "!", "&", and "+", in descending priority order.

A frame buffer (not shown) may be divided into tiles of, for example, 32 by 32 pixels. Triangles (and portions thereof) that are within a given tile are rasterized one triangle at a time into the tile location. This process repeats for each tile in the image frame. For graphics applications, this process repeats for each image frame in the graphics stream.

Figure 1:
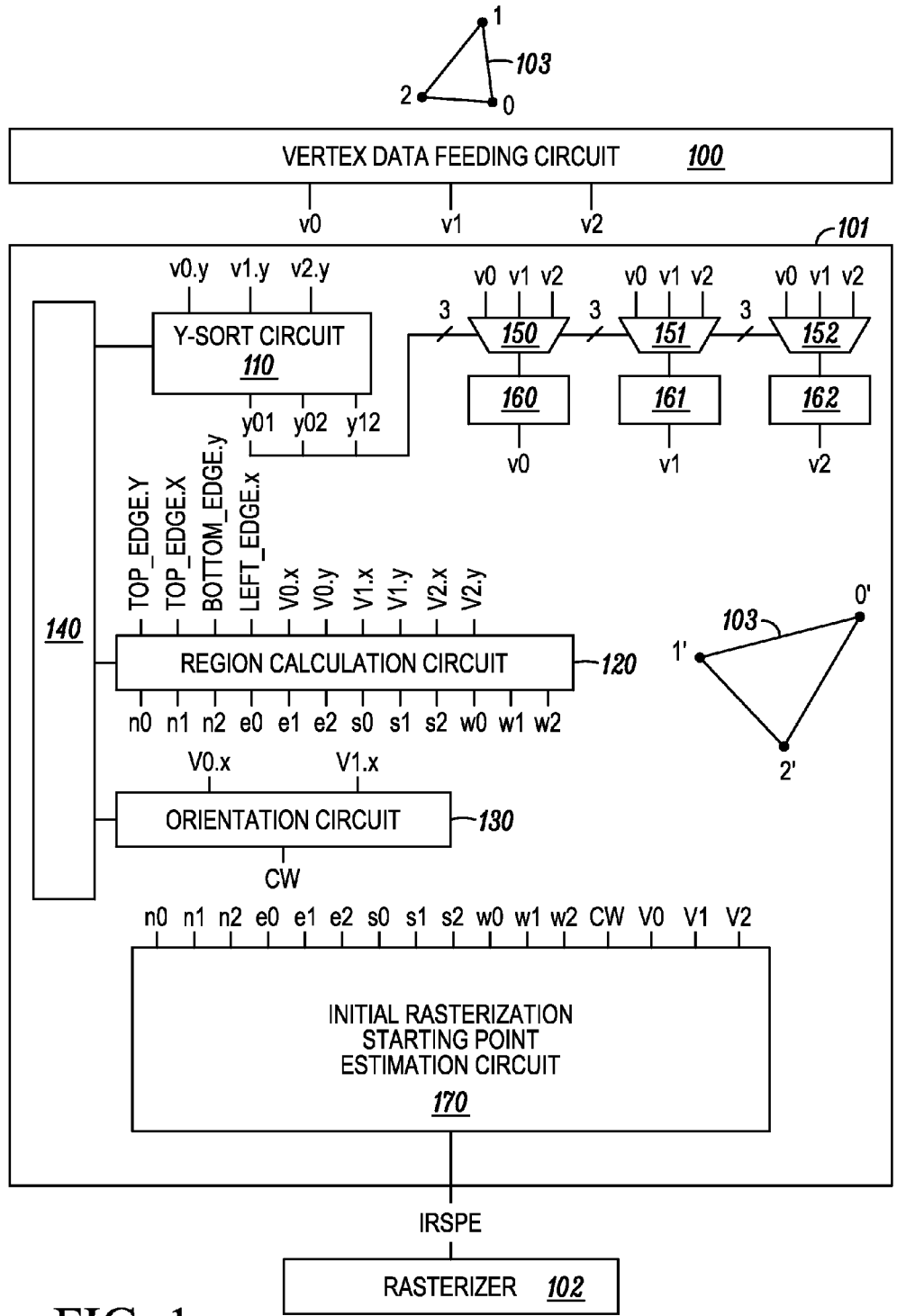
FIG. 1 is a schematic diagram of a setup engine according to the invention.

FIG. 1 shows a setup engine 101 that receives triangle vertex data v0, v1 and v2 from a vertex data feeding circuit 100, and provides data including an initial rasterization starting point estimate ("IRSPE") to a rasterizer 102. Although the vertex data v0, v1 and v2 are shown transmitted over three separate buses in FIG. 1, the vertex data v0, v1 and v2 may also be transmitted serially over a single bus as is known in the art. Vertex data v0, v1 and v2 represent a corresponding vertex 0, 1 and 2 of a triangle 103 to be set up for rasterization. The vertex data v0, v1 and v2 include, but are not limited to, x-coordinate components v0.x, v1.x and v2.x and y-coordinate components v0.y, v1.y and v2.y, respectively. The vertex data v0, v1 and v2 may also include, z-coordinate, color, blending and texture data, and other data as desired.

Setup engine 101 transforms the vertex data v0, v1 and v2 by 1) sorting the vertex data v0, v1 and v2 in y-coordinate order, 2) trivially discarding vertex data of triangles entirely outside of the current tile, 3) estimating an initial rasterization starting point that minimizes the searching by rasterizer 102 required to find the rasterization starting point of the triangle 103, and 4) any other operations on v0, v1 and v2 as desired. Rasterizer 102 draws whatever portions of triangle 103 that are within a given tile into a frame buffer (not shown).

Setup engine 101 sorts vertex data v0, v1 and v2 in y-coordinate order to simplify the downstream logic circuit as the number of permutations the downstream logic circuit must deal with is reduced due to the predictability of the y-ordering. Of course, this ordering may be in descending or ascending y-coordinate order as long as the y-positioning of the vertex is made predictable. Furthermore, if the rasterizer rasterizes vertically, setup engine 101 may sort the vertices according to the x-coordinate. For clarity, in the example that follows, the vertices are described as being sorted in descending y-coordinate order.

A y-sort circuit 110 receives the y-coordinate data v0.y, v1.y and v2.y, and generates control bits y01, y02, and y12 which cause multiplexers 150, 151 and 152 to sort the vertex data v0, v1 and v2 in, for example, descending y-coordinate order. Bit y01 has a value 1 only if v0.y is greater than v1.y, bit y02 has a value 1 only if v0.y is greater than v2.y, and bit y12 has a value 1 only if v1.y is greater than v2.y. Table 1 summarizes the y-coordinate ordering given input bits y01, y02 and y12.

TABLE (1)

| case # | y01 | y02 | y12 | v0.y | v1.y | v2.y | FIG. |
|---|---|---|---|---|---|---|---|
| 0 | 1 | 1 | 1 | highest | middle | lowest | 3A |
| 1 | 1 | 1 | 0 | highest | lowest | middle | 3B |
| 2 | 1 | 0 | 1 | — | — | — | none |
| 3 | 1 | 0 | 0 | middle | lowest | highest | 3C |
| 4 | 0 | 1 | 1 | middle | highest | lowest | 3D |
| 5 | 0 | 1 | 0 | — | — | — | none |
| 6 | 0 | 0 | 1 | lowest | highest | middle | 3E |
| 7 | 0 | 0 | 0 | lowest | middle | highest | 3F |

The six possible cases 0, 1, 3, 4, 6 and 7 of Table (1) for the y-coordinate-ordering of the three vertices are shown respectively in FIGS. 3A, 3B, 3C, 3D, 3E and 3F.

In response to control bits y01, y02 and y12, multiplexer 150 passes the vertex data having the highest y-coordinate value (v0 in cases 0 and 1, v1 in cases 4 and 6, and v2 in cases 3 and 7) into memory 160. Multiplexer 151 passes the vertex data having the middle y-coordinate value (v0 in cases 3 and 4, v1 in cases 0 and 7, and v2 in cases 1 and 6) into memory 161. Multiplexer 152 passes the vertex data having the lowest y-coordinate value (v0 is cases 6 and 7, v1 in cases 1 and 3, and v2 in cases 0 and 4) into memory 162. Hereinafter, the vertex data in memories 160, 161 and 162 are respectively referred to as "highest vertex data V0", "middle vertex data V1" and "lowest vertex data V2" corresponding to the sorted vertices 0', 1' and 2' of triangle 103'. Y-sorting of the vertex data is thus completed.

Figure 4:
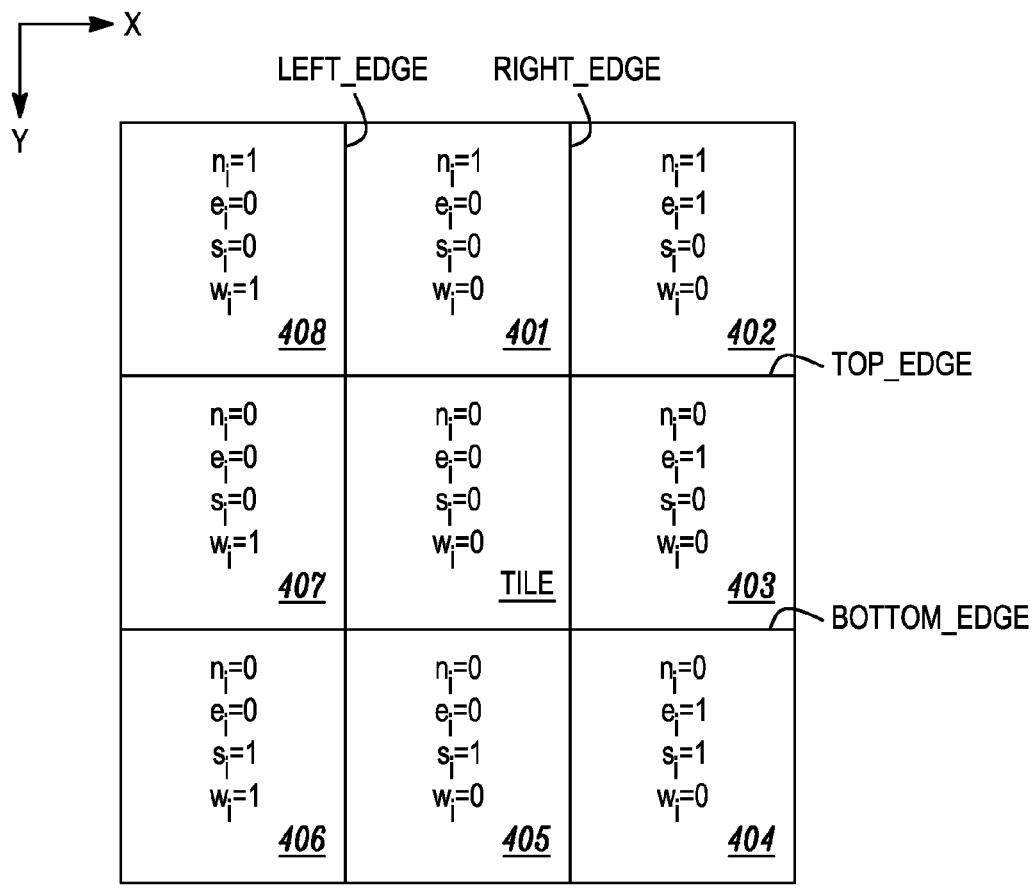
FIG. 4 shows the current tile and eight surrounding regions.

After sorting, a trivial discard analysis occurs as follows. FIG. 4 shows the current tile TILE and eight surrounding regions 401–408. TILE is defined by edges TOP_EDGE, RIGHT_EDGE, BOTTOM_EDGE and LEFT_EDGE. Hereinafter, the x-coordinate position of LEFT_EDGE and RIGHT_EDGE is LEFT_EDGE.x and RIGHT_EDGE.x, respectively. The y-coordinate position of TOP_EDGE and BOTTOM_EDGE is TOP_EDGE.y and BOTTOM_EDGE.y, respectively.

Referring to FIG. 1, a region calculation circuit 120 reads the permuted x-coordinate data (V0.x, V1.x and V2.x), the sorted y-coordinate data (V0.y, V1.y and V2.y), and the tile boundaries TOP_EDGE.y, BOTTOM_EDGE.y, LEFT_EDGE.x and RIGHT_EDGE.x. Based on these values, region calculation circuit 120 generates region bits n0, n1, n2, e0, e1, e2, s0, s1, s2, w0, w1 and w2 representing the position of the sorted vertices 0', 1' and 2' with respect to TILE.

Referring to FIG. 4, vertex i' (where i is 0, 1 or 2) is considered north ($n_i=1$) of TILE if its y-coordinate is greater than TOP_EDGE.y (regions 408, 401 and 402 of FIG. 4), east ($e_i=1$) of TILE if its x-coordinate is greater than RIGHT_EDGE.x (regions 402, 403 and 404), south ($s_i=1$) of TILE if its y-coordinate is less than BOTTOM_EDGE.y (regions 406, 405 and 404 of FIG. 4), and west ($w_i=1$) of the tile if its x-coordinate is less than LEFT_EDGE.x (regions 408, 407 and 406 of FIG. 4).

An orientation circuit 130 generates a bit CW having a value 1 only if the line ("line 0'2'") connecting vertex 0' and 2' is oriented clockwise from the line ("line 0'1'") connecting vertex 0' and 1'. In other words, orientation circuit 130 assigns a value 1 to bit CW only if Equation (1) is true.

$$(V0.x-V1.x)(V0.y-V2.y) < (V0.x-V2.x)(V0.y-V1.y) \qquad (1)$$

Y-sort circuit 110, region calculation circuit 120 and orientation circuit 130 all have access to a comparator 140 to perform the above comparisons.

Figure 2:
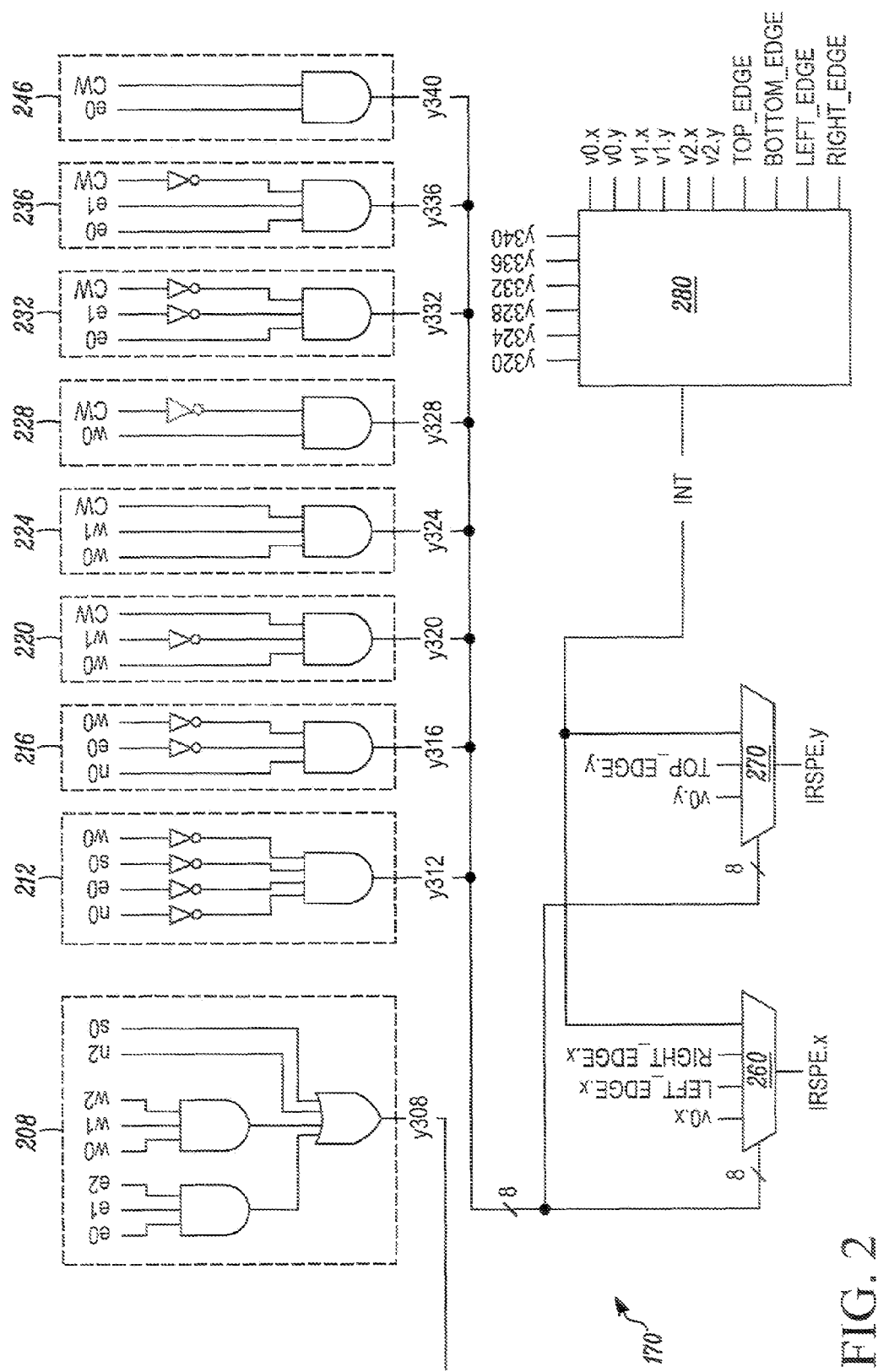
FIG. 2 is a detailed diagram of the initial rasterization starting point estimation circuit of FIG. 1.
Figure 3A:
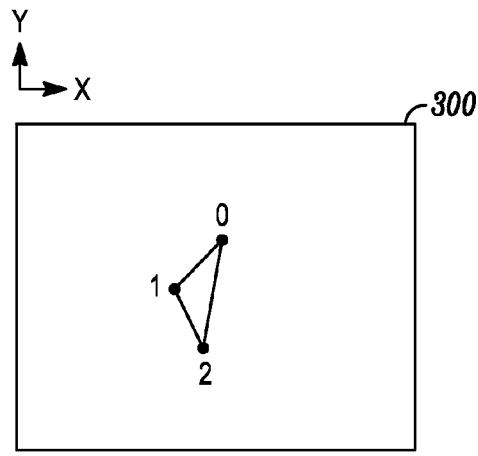
FIGS. 3A, 3B, 3C, 3D, 3E and 3F show various permutations of y-coordinate ordering of triangle vertices.
Figure 3B:
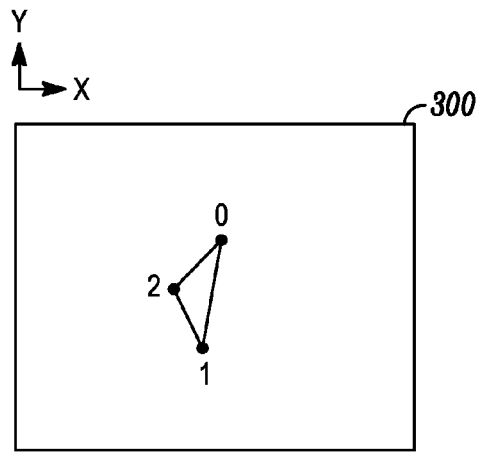
Figure 3C:
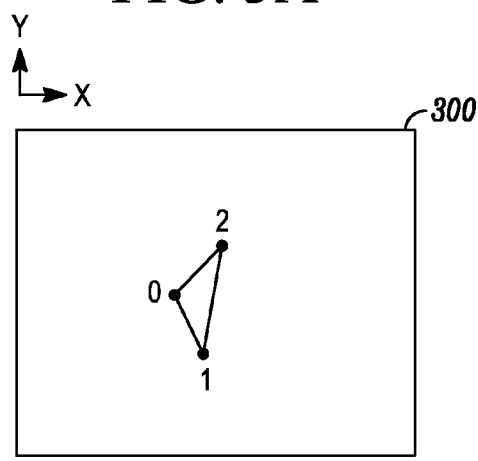
Figure 3D:
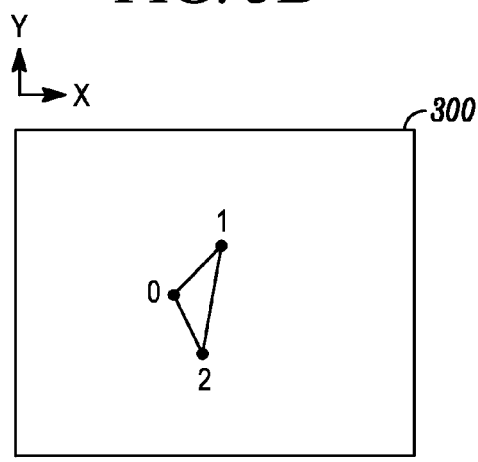
Figure 3E:
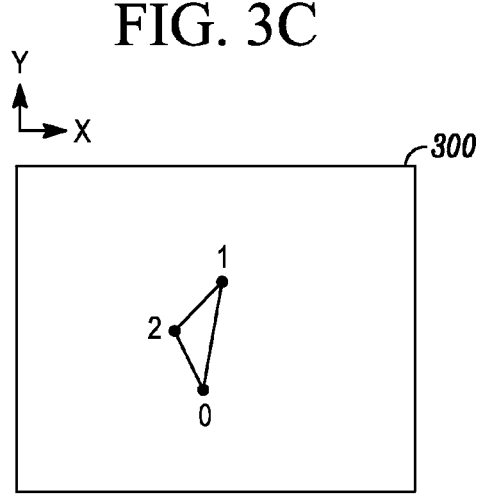
Figure 3F:
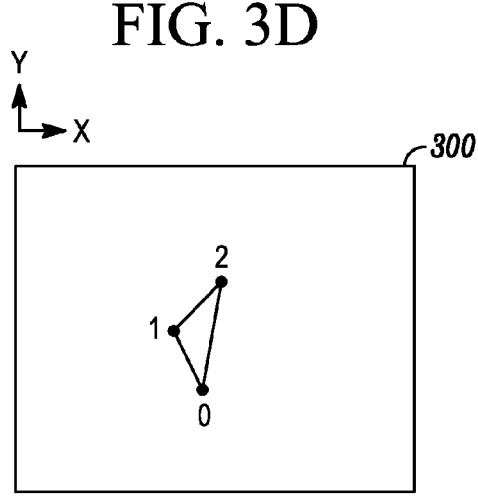

The region bits n0, n1, n2, e0, e1, e2, s0, s1, s2, w0, w1 and w2; the orientation bit CW; and the vertex data V0, V1 and V2 are inputted into IRSPE circuit 170 (FIG. 1) shown in further detail in FIG. 2. IRSPE circuit 170 may be, for example, a portion of a larger setup operational unit.

Referring to FIG. 2, IRSPE circuit 170 trivially discards the triangle 103 under certain conditions as shown in Table (2) in which the triangle lies completely outside of TILE.

TABLE 2

| Case # | trivial discard if true | rationale for trivial discard |
|---|---|---|
| 1 | n2 = 1 | implies entire triangle is north of TILE (i.e., north of TOP_EDGE) |
| 2 | s0 = 1 | implies entire triangle is south of TILE (south of BOTTOM_EDGE) |
| 3 | w0&w1&w2 = 1 | implies entire triangle is west of TILE (i.e., west of LEFT_EDGE |
| 4 | e0&e1&e2 = 1 | implies entire triangle is east of TILE (i.e., east of RIGHT_EDGE) |

Figure 5:
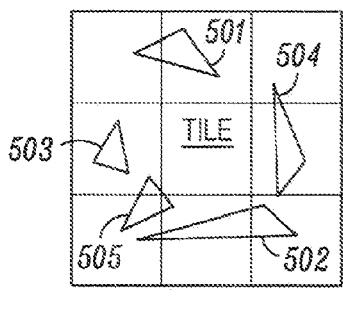
FIG. 5 shows four triangles that are trivially discarded and one which is not.

Cases 1, 2, 3 and 4 are shown respectively as triangles 501, 502, 503 and 504 of FIG. 5. If any one of cases 1 to 4 of Table (2) is true, trivial discard circuit 208 generates a bit y308 of a value 1, causing setup engine 101 (FIG. 1) to request the next triangle for TILE without providing data to rasterizer 102 (FIG. 1).

Note that bit y308 sometimes has a value 0 even though the triangle (e.g., triangle 505 of FIG. 5) lies entirely outside of TILE. Performing a discard step for all triangles that are entirely outside of TILE would be computationally intensive and might slow down the triangle setup procedure.

If none of the trivial discard cases are true (i.e., bit y308 has a value 0), setup engine 101 estimates an initial rasterization starting point. This reduces the number of cycles required for rasterizer 102 to find the first pixel that requires assignment of luminance and/or color values.

A typical rasterizer checks each pixel in a field (e.g., a tile or frame) to determine if the pixel is positioned within an object (e.g., a triangle). If not, the rasterizer proceeds to the next pixel and so on in a raster pattern until a pixel is found which is positioned in the object. Once a pixel within the object is found, there are numerous conventional ways to reduce the number of pixels checked by a rasterizer before the object is entirely rasterized. However, often significant time is taken finding a pixel that lies within the object. Setup engine 101 (FIG. 1) provides rasterizer 102 (FIG. 1) with initial rasterization starting point estimation coordinates IRSPE.x and IRSPE.y to reduce this time.

Specifically, referring to FIG. 2, IRSPE circuit 170 generates control bits y312, y316, y320, y324, y328, y332, y336 and y340 causing multiplexers 260 and 270 to pass the estimate coordinates IRSPE.x and IRSPE.y as described below.

Figure 6:
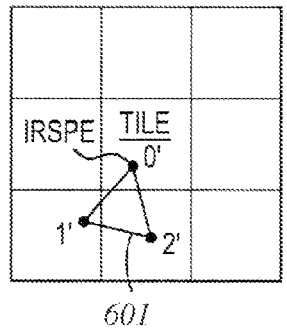
FIG. 6 shows a triangle that is trivially accepted.

Trivial accept circuit 212 assigns a value 1 to bit y312 only if !n0&!e0&!s0&!w0 equals 1, in which case the highest vertex 0' lies within the selected tile as in triangle 601 of FIG. 6. If bit y312 has value 1, multiplexers 260 and 270 pass the actual coordinates V0.x and V0.y of the top vertex 0 as IRSPE.x and IRSPE.y.

Figure 7:
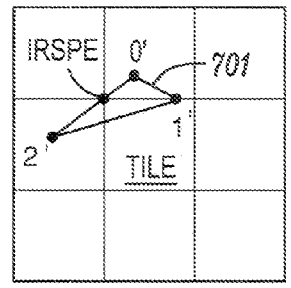
FIG. 7 shows a triangle of which the highest vertex lies north of the current tile.

Circuit 216 assigns a value 1 to bit y316 only if n0&!e0&!w0 equals 1, in which case the highest vertex 0' lies directly north of TILE as in triangle 701 of FIG. 7. Since there has been no trivial discard of triangle 103', triangle 103' does not lie entirely north of TOP_EDGE. Thus, the line 0'2' must intersect with TOP_EDGE if bit y316 has a value 1. A bit y316 of value 1 causes an intercept calculation circuit 280 to output value INT representing the x-intercept of line 0'2' with TOP_EDGE, the value INT being horizontally clamped right to LEFT_EDGE.x or left to RIGHT_EDGE.x if needed. A bit y316 of value 1 causes multiplexers 260 and 270 to pass INT as IRSPE.x and TOP_EDGE.y as IRSPE.y.

Figure 8:
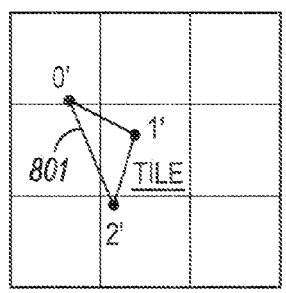
FIG. 8 shows a triangle of which line 0'1' is the highest line of the triangle to intersect LEFT_EDGE.

Circuit 220 assigns a value 1 to bit y320 only if w0&!w1&CW has a value 1, in which case the line 0'1' is the highest line of the triangle to intersect LEFT_EDGE as in triangle 801 of FIG. 8. A bit 320 of value 1 causes the intercept calculation circuit 280 to assign, as value INT, the y-intercept of line 0'1' with LEFT_EDGE, the value INT being vertically clamped down to TOP_EDGE if INT is higher than TOP_EDGE, or clamped up to BOTTOM_EDGE if INT is lower than BOTTOM_EDGE. Hereinafter, this clamping is referred to as "vertical clamping". A bit y320 of value 1 causes multiplexers 260 and 270 to pass LEFT_EDGE.x as IRSPE.x and INT as IRSPE.y.

Figure 9:
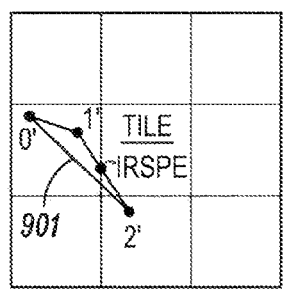
FIG. 9 shows a triangle of which line 1'2' is the highest line of the triangle to intersect LEFT_EDGE.

Circuit 224 assigns a value 1 to bit y324 only if w0&w1&CW equals 1. Since no trivial discard has occurred, the triangle does not lie entirely west of LEFT_EDGE. Thus, w2 must have a value 0. In this case, line 1'2' is the highest line of the triangle to intersect LEFT_EDGE as in triangle 901 of FIG. 9. A bit 324 of value 1 causes the intercept calculation circuit 280 to assign, as value INT, the vertically clamped y-intercept of line 1'2' with LEFT_EDGE. A bit y324 of value 1 causes multiplexers 260 and 270 to pass LEFT_EDGE.x as IRSPE.x and INT as IRSPE.y.

Figure 10:
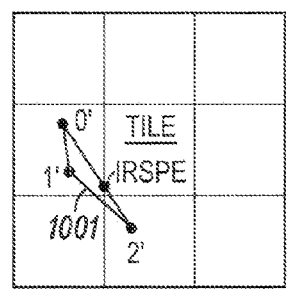
FIG. 10 shows a triangle of which line 0'2' is the highest line of the triangle to intersect LEFT_EDGE.

Circuit 228 assigns a value 1 to bit y328 only if w0&!CW equals 1. Since no trivial discard has occurred, line 0'2' is the highest line to intersect LEFT_EDGE as in triangle 1001 of FIG. 10. A bit 328 of value 1 causes the intercept calculation circuit 280 to assign, as value INT, the vertically clamped y-intercept of line 0'2' with LEFT_EDGE. A bit y328 of value 1 causes multiplexers 260 and 270 pass LEFT_EDGE.x as IRSPE.x and INT as IRSPE.y.

Figure 11:
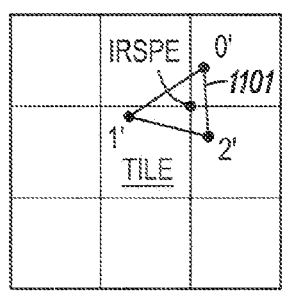
FIG. 11 shows a triangle of which line 0'1' is the highest line of the triangle to intersect RIGHT_EDGE.

Circuit 232 assigns a value 1 to bit y332 only if e0&!e1&!CW equals 1, in which case the line 0'1' is the highest line to intersect RIGHT_EDGE as in triangle 1101 of FIG. 11. A bit 332 of value 1 causes the intercept calculation circuit 280 to assign, as value INT, the vertically clamped y-intercept of line 0'1' with RIGHT_EDGE. A bit y332 of value 1 causes multiplexers 260 and 270 pass RIGHT_EDGE.x as IRSPE.x and INT as IRSPE.y.

Figure 12:
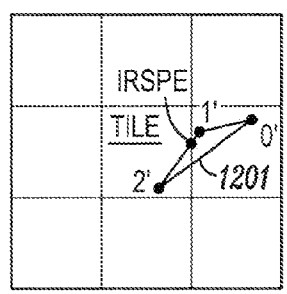
FIG. 12 shows a triangle of which line 1'2' is the highest line of the triangle to intersect RIGHT_EDGE.

Circuit 336 assigns a value 1 to bit y336 only if e0&e1&!CW equals 1, in which case the line 1'2' is the highest line to intersect RIGHT_EDGE as in triangle 1201 of FIG. 12. A bit 336 of value 1 causes the intercept calculation circuit 280 to assign, as value INT, the vertically clamped y-intercept of line 1'2' with RIGHT_EDGE. A bit y336 of value 1 causes multiplexers 260 and 270 to pass RIGHT_EDGE.x as IRSPE.x and INT as IRSPE.y.

Figure 13:
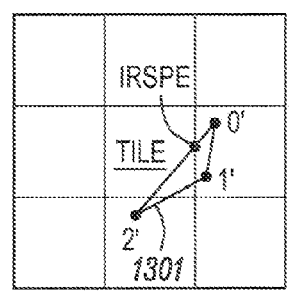
FIG. 13 shows a triangle of which line 0'2' is the highest line of the triangle to intersect RIGHT_EDGE.

Circuit 240 assigns a value 1 to bit y340 only if e0&CW equals 1, in which case, since no trivial discard has occurred, the line 0'2' is the highest line to intersect RIGHT_EDGE as in triangle 1301 of FIG. 13. A bit 340 of value 1 causes the intercept calculation circuit 280 to assign, as value INT, the vertically clamped y-intercept of line 0'2' with RIGHT_EDGE. A bit y340 of value 1 causes multiplexers 260 and 270 pass RIGHT_EDGE.x as IRSPE.x and INT as IRSPE.y.

Thus, an initial rasterization starting point is estimated. Rasterizer 102 may now find the rasterization starting point faster using coordinates IRSPE.x and IRSPE.y. Note that assuming no trivial discard has occurred, exactly one of bits 312, 316, 320, 324, 328, 332, 336 and 340 has a value 1.

This process is repeated for all triangles within the selected tile, and for all tiles within the image frame. Although the above describes a specific embodiment of the present invention, this embodiment is illustrative only and not limiting. Various modifications and substitutions will be apparent to one skilled in the art. All such modifications and substitutions are intended to be part of the present invention. The invention is defined by the following claims.

We claim:

1. A method for providing an initial rasterizing point, comprising:
   receiving vertex data corresponding to the vertices of a primitive, the vertex data including x-coordinate and y-coordinate position information;
   sorting the vertex data in coordinate-dependent fashion;
   generating region bits representing the location of the sorted vertex data with respect to a current tile being rendered;
   generating coordinate data representing an initial rasterization starting point estimate that is within the current tile when the region bits indicate that at least one of the sorted vertex data lies within the current tile being rendered and discarding the sorted vertex data of primitives that lie outside the boundary of the current tile being rendered; and
   providing the initial rasterization starting point estimate to a rasterizer.

2. The method of claim 1, further comprising:
   generating an orientation bit representing an orientation of a line connecting the first and second vertices of the sorted primitive with respect to a line connecting the first and third vertices of the sorted primitive before generating the initial rasterization starting point coordinates.

3. A circuit, comprising:
   a sorting circuit operative to provide sorted vertex data in response to input data corresponding to vertices of a primitive, the vertex data being sorted in a coordinate-dependent fashion, the vertex data including x-coordinate and y-coordinate position information;

a region calculation circuit, coupled to the sorting circuit, operative to receive the sorted vertex data and to generate region bits representing the location of the sorted vertex data with respect to a current tile being rendered; and an initial rasterization starting point circuit, coupled to the region calculation circuit, operative to generate an initial rasterization starting point coordinate that is within the current tile in response to the region bits, the initial rasterization starting point circuit including a discard circuit operative to discard the vertex data of a primitive that lies outside the boundary defined by the current tile.

4. The circuit of claim 3, wherein the initial rasterization starting point circuit further includes a trivial accept circuit operative to provide the actual coordinates of the primitive as the initial rasterization starting point in response to the region bits.

5. The circuit of claim 4, wherein the vertex data is sorted in y-coordinate fashion and the trivial accept circuit provides the x-coordinate and sorted y-coordinate rasterization starting point of a non-discarded primitive.

6. The circuit of claim 4, wherein the trivial accept circuit further comprises a logic gate coupled to a corresponding subset of the region bits.

7. The circuit of claim 6, wherein the logic gate is an AND gate.

8. The circuit of claim 3, wherein the vertex data includes x-coordinate position data and y-coordinate position data and further including an intercept calculation circuit operative to generate the initial rasterization starting point when the x-coordinate position data or the y-coordinate position data intercepts the boundary defined by the region bits.

9. The circuit of claim 8, wherein the boundary interception point generated by the intercept calculation circuit represents the initial rasterization point starting point coordinate.

10. The circuit of claim 8, wherein the intercept calculation circuit clamps the x-coordinate and y-coordinate of the initial rasterization starting point to the boundary intercept points.

11. The circuit of claim 3, further comprising an interception calculation circuit operative to provide a coordinate dependent initial rasterization starting point in response to the region bits and the sorted vertex data.

12. The circuit of claim 3, wherein the region bits define the top edge, bottom edge, right edge and left edge of a current tile being rendered.

13. The circuit of claim 3, wherein the discard circuit further comprises a first AND gate having an output and inputs coupled to data representing the right most boundary of the current tile being rendered; a second AND gate having an output and inputs coupled to data representing the left most boundary of the current tile being rendered; and an OR gate having a first input coupled to the output of the first AND gate, a second input coupled to the output of the second AND gate, a third input coupled to data representing the top most boundary of the current tile and a fourth input coupled to data representing the bottom most boundary of the current tile, wherein the output of the OR gate provides a signal indicating whether the sorted vertex data lies within the current tile being rendered.

14. The circuit of claim 3, further including an orientation circuit, coupled to the region calculation circuit, operative to generate an orientation bit representing an orientation of a line connecting the sorted first and second vertices with respect to a line connecting the sorted first and third vertices.

15. The circuit of claim 3, further including a comparator circuit operative to determine the relative positioning between the vertices of the primitive and the current tile being rendered.

16. A circuit for optimally determining an initial rasterization starting point, comprising:

a sorting circuit operative to provide sorted vertex data in response to input data corresponding to vertices of a primitive, the vertex data being sorted in a coordinate-dependent fashion, the vertex data including x-coordinate and y-coordinate position information;

a region calculation circuit, coupled to the sorting circuit, operative to receive the sorted vertex data and to generate region bits representing the location of the sorted vertex data with respect to a current tile being rendered; and an initial rasterization starting point circuit, coupled to the region calculation circuit, operative to generate an initial rasterization starting point coordinate that is within the current tile when the region bits indicate that at least one of the sorted vertex data lies within the current tile, the initial rasterization starting point circuit including a discard circuit operative to discard the vertex data of primitives whose vertices lie outside the boundary defined by the current tile.

17. A method, comprising:

(a) receiving a pixel tile containing vertex position data for a plurality of primitives;

(b) sorting the primitives in axis-dependent order;

(c) determining whether the sorted primitives are positioned within a current tile to be transmitted to a rasterizer;

(d) determining an initial rasterization point that is within the current tile within the sorted primitive; and (e) discarding the sorted vertex data of primitives that lie outside the boundary of the current tile being rendered.

18. The method of claim 17, wherein the position data includes x-coordinate and y-coordinate position data, and the sorting step comprises arranging the position data in y-coordinate order.

19. The method of claim 18, wherein the primitives are arranged in descending y-coordinate order.

20. The method of claim 18, wherein the primitives are arranged in ascending y-coordinate order.

21. The method of claim 17, wherein the position data includes x-coordinate and y-coordinate position data, and the sorting step comprises arranging the position data in x-coordinate order.

22. The method of claim 21, wherein the primitives are arranged in descending x-coordinate order.

23. The method of claim 21, wherein the primitives are arranged in ascending x-coordinate order.

24. The method of claim 17, wherein the position data includes x-coordinate and y-coordinate position data and the position determination step (c) further comprises:

(c1) comparing the x-coordinate position data with the corresponding coordinate position data of the current tile; and wherein discarding comprises:

(c2) discarding the primitive when the x-coordinate position is greater than the largest corresponding coordinate position of the current tile.

25. The method of claim 17, wherein the position data includes x-coordinate and any y-coordinate position data and the position determination step (c) further comprises:
  (c3) comparing the x-coordinate position data with the corresponding coordinate position data of the current tiles; and
  wherein discarding comprises:
  (c4) discarding the primitive when the x-coordinate position is less than the smallest corresponding coordinate position of the current tile.

26. The method of claim 17, wherein the position data includes x-coordinate and y-coordinate position data and the position determination step (c) further comprises:
  (c5) comparing the y-coordinate position data with the corresponding coordinate position data of the current tile; and
  wherein discarding comprises:
  (c6) discarding the primitive when the y-coordinate position is greater than the largest corresponding coordinate position of the current tile.

27. The method of claim 17, wherein the position data includes x-coordinate and y-coordinate position data and the position determination step (c) further comprises:
  (c7) comparing the y-coordinate position data with the corresponding coordinate position data of the current tile; and
  wherein discarding comprises:
  (c8) discarding the primitive when the y-coordinate position is less than the smallest corresponding coordinate position of the current tile.

28. The method of claim 17, wherein the initial rasterization determination step (d) further comprises:
  (d1) generating an initial x-coordinate and an initial y-coordinate based on the corresponding x-coordinate and sorted y-coordinate of the primitive within the current tile.

29. The method of claim 28, wherein the initial rasterization determination step (d) further comprises:
  (d2) generating the initial x-coordinate and y-coordinate based on the boundary region of the current tile.

30. A method, comprising:
  receiving a pixel tile containing vertex position data for a plurality of primitives;
  sorting the primitives in axis-dependent order;
  comparing the x-coordinate position data with the corresponding coordinate position data of the current tile;
  discarding the primitive when the x-coordinate position is greater than the largest corresponding coordinate position of the current tile;
  discarding the primitive when the x-coordinate position is less than the smallest corresponding coordinate position of the current tile; and
  determining an initial rasterization point that is within the current tile within the sorted primitive.

31. The method of claim 30, wherein determining an initial rasterization point further comprises:
  generating the initial x-coordinate and y-coordinate based on the boundary region of the current tile.

32. A method for providing an initial rasterizing point, comprising:
  receiving vertex data corresponding to the vertices of a primitive, the vertex data including x-coordinate and y-coordinate position information;
  sorting the vertex data and coordinate dependent fashion;
  generating region bits comprising the location of the sorted vertex data with respect to a current tile being rendered;
  generating an initial rasterization starting point based on a determined interception of x-coordinate position data or the y-coordinate position data with the boundary defined by the region bits; and
  providing the initial rasterization starting point estimate to a rasterizer.

* * * * *